United States Patent
Ohta

(10) Patent No.: US 9,312,521 B2
(45) Date of Patent: Apr. 12, 2016

(54) CELL, ASSEMBLED BATTERY, AND BATTERY-MOUNTED DEVICE

(75) Inventor: Hiroshi Ohta, Miyoshi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 147 days.

(21) Appl. No.: 14/241,808

(22) PCT Filed: Aug. 29, 2011

(86) PCT No.: PCT/JP2011/004807
§ 371 (c)(1),
(2), (4) Date: Feb. 27, 2014

(87) PCT Pub. No.: WO2013/030869
PCT Pub. Date: Mar. 7, 2013

(65) Prior Publication Data
US 2014/0227581 A1    Aug. 14, 2014

(51) Int. Cl.
*H01M 2/06* (2006.01)
*H01M 2/30* (2006.01)
*H01M 2/02* (2006.01)
*H01M 2/22* (2006.01)
*H01M 2/24* (2006.01)
H01M 2/26 (2006.01)

(52) U.S. Cl.
CPC  *H01M 2/06* (2013.01); *H01M 2/02* (2013.01); *H01M 2/022* (2013.01); *H01M 2/024* (2013.01); *H01M 2/22* (2013.01); *H01M 2/24* (2013.01); *H01M 2/30* (2013.01); *H01M 2/305* (2013.01); *H01M 2/26* (2013.01)

(58) Field of Classification Search
CPC ......... H01M 2/06; H01M 2/02; H01M 2/022; H01M 2/024
See application file for complete search history.

(56) References Cited

U.S. PATENT DOCUMENTS

| 2010/0047686 A1 | 2/2010 | Tsuchiya et al. |
| 2011/0045345 A1 | 2/2011 | Tsuchiya et al. |
| 2011/0092111 A1 | 4/2011 | Tsuchiya et al. |

FOREIGN PATENT DOCUMENTS

| GB | 668591 | 3/1952 |
| JP | 5-343048 | 12/1993 |
| JP | 9-213302 | 8/1997 |
| JP | 2009-283256 | 12/2009 |
| JP | 2009-301874 | 12/2009 |
| JP | 2010-97822 | 4/2010 |
| JP | 2011-23141 | 2/2011 |
| JP | 2011-66012 | 3/2011 |
| JP | 2013-48047 | 3/2013 |

*Primary Examiner* — Stewart Fraser
(74) *Attorney, Agent, or Firm* — Finnegan, Henderson, Farabow, Garrett & Dunner, LLP

(57) ABSTRACT

Disclosed is a cell including: a closed-end tubular case for accommodating a power generation element; a lid for the case; a terminal electrode disposed outside of the case and used for connection with another cell; an extraction electrode passing through the lid and used to extract power of the power generation element to the outside of the case; and a stepped connection electrode disposed outside of the case, the stepped connection electrode having a first flat portion to which the terminal electrode is connected and a second flat portion which is located at a level different from the level of the first flat portion and to which the extraction electrode is connected. The first and second flat portions have regions overlapping each other as viewed in a direction orthogonal to the thickness of the first and second flat portions.

8 Claims, 6 Drawing Sheets

CELL, ASSEMBLED BATTERY, AND BATTERY-MOUNTED DEVICE

CROSS-REFERENCE TO RELATED APPLICATIONS

This application is a national phase application of International Application No. PCT/JP2011/004807, filed Aug. 29, 2011, the content of which is incorporated herein by reference.

TECHNICAL FIELD

The present invention relates to an attachment structure for a terminal electrode attached to a cell, and so forth.

BACKGROUND ART

One known battery having a higher capacity and higher power than batteries for portable devices, for example, batteries for power sources for driving power tools is an assembled battery including a plurality of single cells connected through bus bars. The bus bars are secured to terminal electrodes protruding from the single cells through nuts fastened to the terminal electrodes Patent Literature 1 discloses a cell including: a lid plate having terminal-drawing through holes formed therethrough and rotation-preventing portions protruding upward from the upper surface of the lid plate; extraction electrodes having lower portions inserted through the terminal-drawing through holes into a cell container and connected to metal foils of a power generation element, the extraction electrodes being secured to the lid plate through insulating sealing members and sealed therewith; connection electrodes connected and secured to the upper portions of the extraction electrodes; and external terminals each having a base portion and a bolt portion protruding upward from the base portion, the bolt portion passing upward through a terminal through hole of one of the connection electrodes, the base portion being engaged with one of the rotation-preventing portions of the lid plate, whereby rotation of the external terminal about the axis of the bolt portion is restricted.

CITATION LIST

Patent Literature

Patent Literature 1: Japanese Patent Application Laid-Open No. 2010-097822

SUMMARY OF INVENTION

Technical Problem

However, in the configuration in Patent Literature 1, a portion of each connection electrode to which one of the external terminals is attached and a portion of the each connection electrode to which one of the extraction electrodes is attached are located in the same plane. Therefore, when a vertical or horizontal external force is applied to the external terminal, a large load may be applied to the portion to which the extraction electrode is attached. Accordingly, it is an object of the present invention to reduce the load applied to the portion to which the extraction electrode is attached.

Solution to Problem

To solve the foregoing problem, (1) a cell according to the present invention includes: a closed-end tubular case for accommodating a power generation element; a lid for the case; a terminal electrode disposed outside of the case and used for connection with another cell; an extraction electrode passing through the lid and used to extract electric power from the power generation element to the outside of the case; and a stepped connection electrode disposed outside of the case, the stepped connection electrode having a first flat portion to which the terminal electrode is connected and a second flat portion to which is located at a level different from the level of the first flat portion and to which the extraction electrode is connected, wherein the first and second flat portions have regions overlapping each other as viewed in a direction orthogonal to a direction of the thickness of the first and second flat portions.

(2) In the configuration according to (1), the extraction electrode may include a rivet portion passing through the lid, and the following conditional expression (1) may be satisfied:

$$A1/A2 \leq 0.5 \tag{1}$$

where A1 is the difference between the level of an upper surface of the first flat portion and the level of an upper surface of the second flat portion, and A2 is the distance between the rivet portion and the terminal electrode.

With the configuration according to (2), a load applied to a portion to which the extraction electrode is attached can be further reduced.

(3) In the configuration according to (2), the extraction electrode may further include a rivet supporting portion located inside the lid to support the rivet portion. A first gasket may be interposed between the second flat portion and the lid, and a second gasket may be interposed between the lid and the rivet support portion. The rivet portion may pass through the second gasket, the lid, the first gasket, and the second flat portion and may be swaged on the upper surface of the second flat portion. With the configuration according to (3), a load applied to the swaged portion of the rivet portion is reduced, so that deformation of the swaged portion and creep of the first and second gaskets are suppressed. A reduction in hermeticity of the case can thereby be reduced.

(4) In the configuration according to any of (1) to (3), a thread groove may be formed on the outer surface of the terminal electrode, and a bus bar for connecting the cell to another cell may be inserted in with the terminal electrode. A nut may be screwed onto the thread groove. Even when the fastening torque of the nut is increased, an increase in a load applied to a portion to which the extraction electrode is attached can be suppressed. A reduction in output power of the cell can thereby be reduced.

(5) An assembled battery can be formed by connecting a plurality of cells according to any of (1) to (4). With the configuration according to (5), a vibration-resistant assembled battery can be obtained.

(6) The assembled battery according to (5) may be used as a power source for driving a vehicle. With the configuration according to (6), an assembled battery that can resist vehicle vibrations can be obtained.

(7) The assembled battery according to (5) can be used as a power source for driving a power tool. With the configuration according to (7), an assembled battery suitable for a power tool that vibrates during operation can be obtained.

(8) A battery-mounted device on which the vibration-resistant assembled battery according to (5) is mounted may be obtained.

Advantageous Effects of Invention

According to the present invention, a load applied to the portion to which the extraction electrode is attached can be reduced.

DESCRIPTION OF EMBODIMENTS

Figure 1:
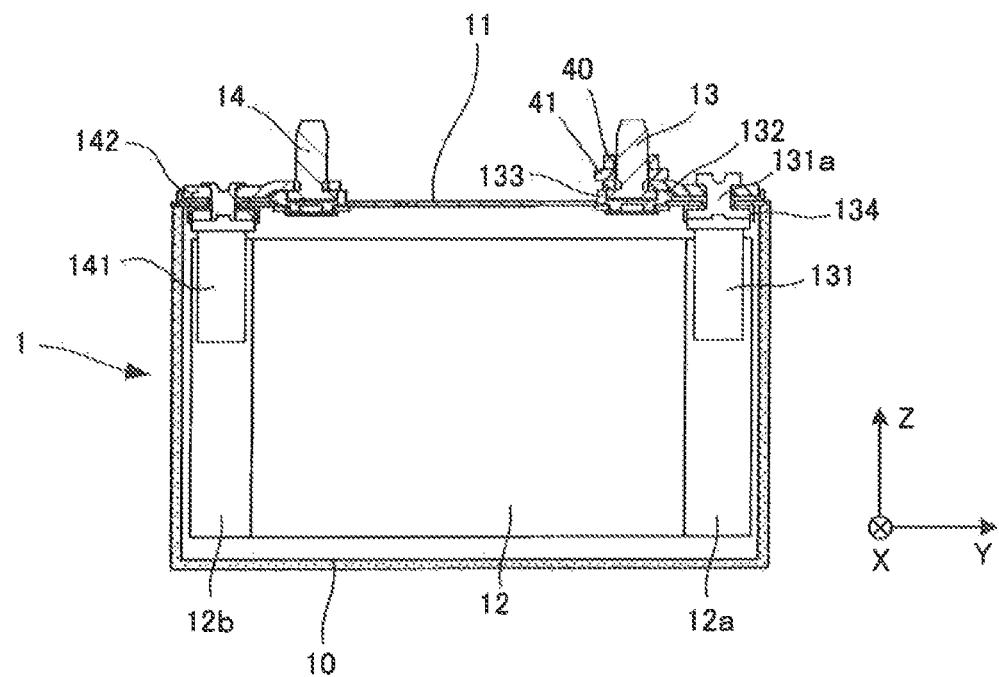
FIG. 1 is a cross-sectional view of a cell for a vehicle.
Figure 2:
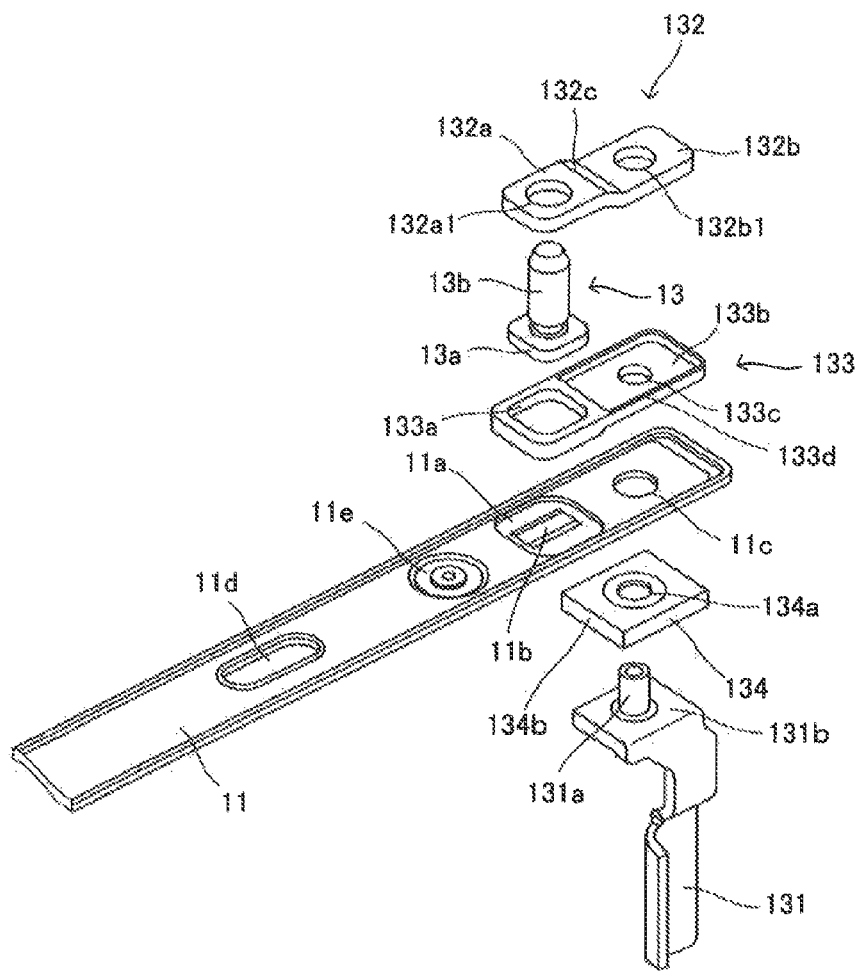
FIG. 2 is an exploded perspective view of a connection structure for a terminal bolt (positive electrode) and a power generation element.
Figure 3:
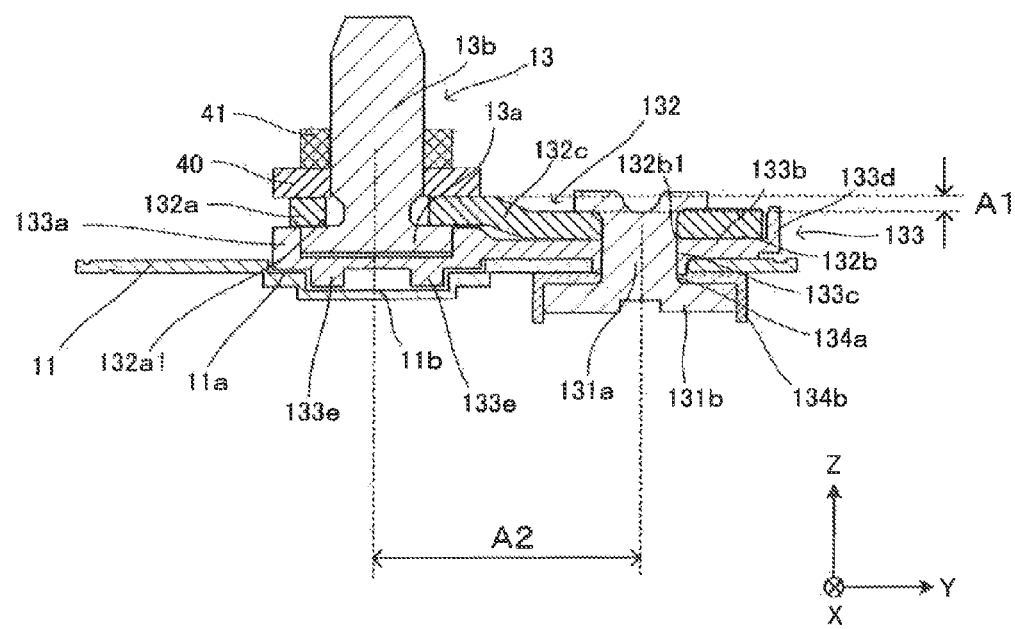
FIG. 3 is a cross-sectional view of the connection structure for the terminal bolt (positive electrode) and the power generation element.

FIG. 1 is a cross-sectional view of a vehicle cell 1 a according to an embodiment, and X, Y, and Z axes are three different mutually orthogonal axes. In FIG. 1, reference numerals for part of components shown in FIGS. 2 and 3 are omitted for simplification of the drawing. The vehicle cell 1 is a nonaqueous electrolyte secondary cell. In the present embodiment, the nonaqueous electrolyte secondary cell is used as the vehicle cell. However, the vehicle cell may be a nickel-hydrogen cell etc. The vehicle cell 1 includes a cell case 10, a lid 11, a power generation element 12, a terminal bolt (positive electrode) 13, and a terminal bolt (negative electrode) 14. The power generation element 12, together with an electrolyte, is accommodated in the cell case 10.

The power generation element 12 includes a positive electrode member, a negative electrode member, and a separator disposed between the positive electrode member and the negative electrode member. A positive electrode-side uncoated portion 12a is formed at one Y-directional end of the power generation element 12, and a negative electrode-side uncoated portion 12b is formed at the other Y-directional end. A current collecting terminal (positive electrode) 131 is electrically and mechanically connected to the positive electrode-side uncoated portion 12a, and a negative electrode-side current collecting terminal 141 is electrically and mechanically connected to the negative electrode-side uncoated portion 12b.

The current collecting terminal (positive electrode) 131 is connected to the terminal bolt (positive electrode) 13 through a connection terminal (positive electrode) 132, and the negative electrode-side current collecting terminal 141 is connected to the terminal bolt (negative electrode) 14 through a negative electrode-side connection terminal 142. With this configuration, the power from the power generation element 12 can be extracted to the outside through the terminal bolt (positive electrode) 13 and the terminal bolt (negative electrode) 14.

Next, a connection structure for the terminal bolt (positive electrode) 13 and the power generation element 12 will be described with reference to FIGS. 1 to 3. FIG. 2 is an exploded perspective view of the connection structure. FIG. 3 is a cross-sectional view of the connection structure. The terminal bolt (positive electrode) 13 includes a base portion 13a and a protruding portion 13b protruding from the base portion 13a. The base portion 13a is formed into a rectangular shape as viewed in the Z axis direction. However, the four corners of the base portion 13a are formed as curved surfaces. The protruding portion 13b has a circular cross section in a direction in an X-Y plane, and a thread groove is formed on its outer circumferential surface.

The connection terminal (positive electrode) 132 is formed into a stepped shape including a terminal-fastening surface 132a serving as a first flat portion to which the terminal bolt (positive electrode) 13 is connected; a terminal-securing surface 132b located at a level different from the level of the terminal-fastening surface 132a and serving as a second flat portion to which a rivet portion 131a, which is part of the current collecting terminal (positive electrode) 131 is connected; and an inclined portion 132c connecting the terminal-fastening surface 132a and the terminal-securing surface 132b. The terminal-fastening surface 132a extends in a plane including the lid 11, i.e., in directions in the X-Y plane, and a terminal insertion hole 132a1 passing through the terminal-fastening surface 132a in its thickness direction (the Z axis direction) is formed at the center of the terminal-fastening surface 132a. The terminal-securing surface 132b extends in a plane including the lid 11, i.e., in directions in the X-Y plane, and a swaging hole 132b1 passing through the terminal-securing surface 132b in its thickness direction (the Z axis direction) is formed at the center of the terminal-securing surface 132b. The inclined portion 132c extends in a direction inclined with respect to the terminal-fastening surface 132a. The terminal-fastening surface 132a and the terminal-securing surface 132b partially overlap each other as viewed in the Y-axis direction. The connection terminal (positive electrode) 132 is formed by bending a metal plate. The metal plate may be formed of aluminum.

The protruding portion 13b of the terminal bolt (positive electrode) 13 is inserted into the terminal insertion hole 132a1 of the terminal-fastening surface 132a. The protruding portion 13b is also inserted into a through hole of a bus bar 40, and a fastening nut 41 is screwed onto the protruding portion 13b. The bus bar 40 and the fastening nut 41 are shown in FIG. 3 but omitted in FIG. 2. The bus bar 40 is thereby electrically connected to the terminal bolt (positive electrode) 13. The bus bar 40 is connected to the terminal bolt (negative electrode) of an adjacent cell (not shown). A plurality of vehicle cells 1 are connected through bus bars 40, and an assembled battery is thereby formed. This assembled battery can be used as a power source for a motor for driving a vehicle. The bus bars 40 may be used for parallel connection of the plurality of vehicle cells 1.

An insulator (first gasket) 133 include a base-accommodating portion 133a formed by recessing part of the insulator 133 and a terminal-supporting portion 133b for supporting the terminal-securing surface 132b. The insulator 133 is formed of an insulating material and interposed between the lid 11 and the terminal bolt (positive electrode) 13. Therefore, a short circuit between the terminal bolt (positive electrode)

13 and the terminal bolt (negative electrode) 14 through the lid 11 can be prevented. The material forming the insulator 133 may be a resin (for example, PPS resin). The insulator 133 may be formed integrally by injection molding.

The base-accommodating portion 133a is formed so as to surround the base portion 13a. The base portion 13a overlaps a thick-walled portion of the insulator 133 as viewed in a horizontal direction (the Y-axis direction). More specifically, the inner bottom surface of the base-accommodating portion 133a is located lower than the support surface of the terminal-supporting portion 133b. Therefore, a force acting on the wall surface of the base-accommodating portion 133a from the base portion 13a of the terminal bolt (positive electrode) 13 when vibrations occur can be received by the thick-walled portion of the insulator 133. This can suppress bending of the wall portion of the base-accommodating portion 133a, so that misalignment of the terminal bolt (positive electrode) 13 can be prevented.

Since the base portion 13a of the terminal bolt (positive electrode) 13 is surrounded by the base-accommodating portion 133a, horizontal misalignment of the base portion 13a can be suppressed. Therefore, a short circuit of the vehicle cell 1 caused by contact between the terminal bolt (positive electrode) 13 and the lid 11 can be prevented. In addition, since the base portion 13a of the terminal bolt (positive electrode) 13 is embedded in the insulator 133, the size of the vehicle cell 1 in its height direction (the Z-axis direction) can be reduced.

The terminal-securing surface 132b of the connection terminal (positive electrode) 132 is placed on the terminal-supporting portion 133b of the insulator 133. An insulator opening 133c is formed in the terminal-supporting portion 133b. The insulator opening 133c is located at a position corresponding to the swaging hole 132b1 of the terminal-securing surface 132b, as viewed in the Z-axis direction. An outer wall portion 133d surrounding the outer circumference of the terminal-securing surface 132b is formed in the terminal-supporting portion 133b, and the terminal-securing surface 132b abuts against the outer wall portion 133d, so that the horizontal movement of the terminal-securing surface 132b is suppressed. Therefore, a short circuit of the vehicle cell 1 caused by contact between the terminal-securing surface 132b and the lid 11 can be prevented. A pair of protrusions 133e are formed on the lower end portion of the insulator 133, and these protrusions 133e are formed at a prescribed interval in the Y-axis direction.

A gas discharge valve lid is formed substantially at the Y-directional center of the lid 11. The gas discharge valve 11d is a breakable valve formed by reducing the thickness of the lid 11 and breaks when the pressure inside the cell case 10 reaches a working pressure in case of a cell anomaly. Therefore, an increase in the pressure inside the cell case 10 can be suppressed. An electrolyte injection port 11e is formed in the lid 11 at a position between the gas discharge valve 11d and the terminal bolt (positive electrode) 13, and the electrolyte is injected into the cell case 10 through the electrolyte injection port 11e.

The insulator 133 is secured to one Y-directional end of the lid 11. A first insulator rotation-preventing portion 11a and a second insulator rotation-preventing portion 11b are formed in the lid 11. The first insulator rotation-preventing portion 11a is formed so as to surround the outer surface of the base-accommodating portion 133a of the insulator 133. Therefore, when a rotational force in the X-Y plane is applied to the insulator 133, the outer surface of the base-accommodating portion 133a abuts against the inner surface of the first insulator rotation-preventing portion 11a, so that the rotation of the insulator 133 can be suppressed.

The second insulator rotation-preventing portion 11b is formed substantially at the center of the first insulator rotation-preventing portion 11a so as to extend in the Y-axis direction. One of the protrusions 133e of the insulator 133 abuts against one Y-directional end face of the second insulator rotation-preventing portion 11b, and the other protrusion 133e abuts against the other Y-directional end face of the second insulator rotation-preventing portion 11b. Therefore, when a rotational force in the X-Y plane is applied to the insulator 133, the outer faces of the protrusions 133e abut against the inner faces of the second insulator rotation-preventing portion 11b, so that the rotation of the insulator 133 can be suppressed more effectively.

The first insulator rotation-preventing portion 11a is formed by recessing part of the lid 11 inwardly toward the cell case 10. The terminal bolt (positive electrode) 13 is thereby disposed in a region close to the cell case 10, so that the size of the vehicle cell 1 in the Z-axis direction can be reduced.

A lid insertion hole 11c is formed in the lid 11. The lid insertion hole 11c is formed at a position corresponding to the insulator opening 133c of the insulator 133, as viewed in the Z-axis direction.

A gasket (second gasket) 134 is interposed between the lid 11 and the current collecting terminal (positive electrode) 131. A circumferential wall 134b surrounding a rivet supporting portion 131b of the current collecting terminal (positive electrode) 131 is formed on the outer circumference of the gasket 134. The gasket 134 is formed of an insulating material. The insulating material may be any of rubber and resin. A gasket opening 134a that comes into intimate contact with the rivet portion 131a formed on the current collecting terminal (positive electrode) 131 is formed in the gasket 134. Since the rivet portion 131a comes into intimate contact with the gasket opening 134a, the hermeticity of the cell case 10 can be improved.

In the assembled vehicle cell 1, the rivet portion 131a passes through the gasket opening 134a, the lid insertion hole 11c, the insulator opening 133c, and the swaging hole 132b1 and is swaged radially outwardly on the terminal-securing surface 132b. The terminal bolt (positive electrode) 13, the insulator 133, the current collecting terminal (positive electrode) 131, and the power generation element 12 are thereby integrated. The structure of a terminal on the negative electrode side is the same as the structure on the positive electrode side, and the description thereof will be omitted.

Figure 4:
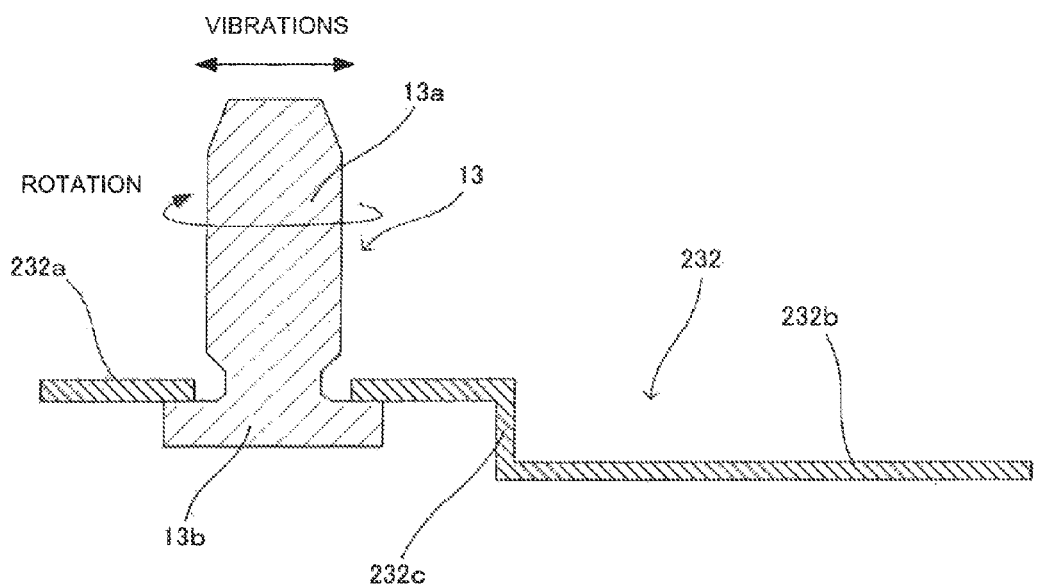
FIG. 4 is a schematic diagram schematically illustrating a force acting on a connection terminal in comparative example 1.
Figure 5:
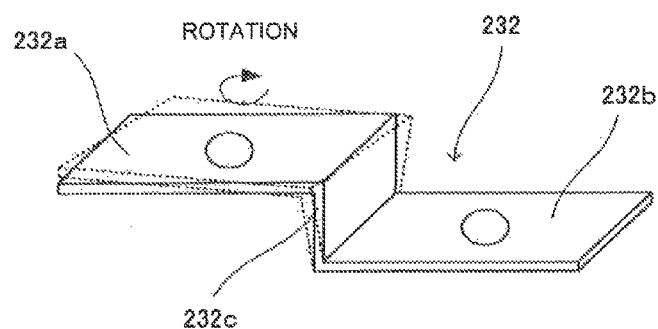
FIG. 5 illustrates the behavior of the connection terminal when a rotational force is applied as an external force.
Figure 6:
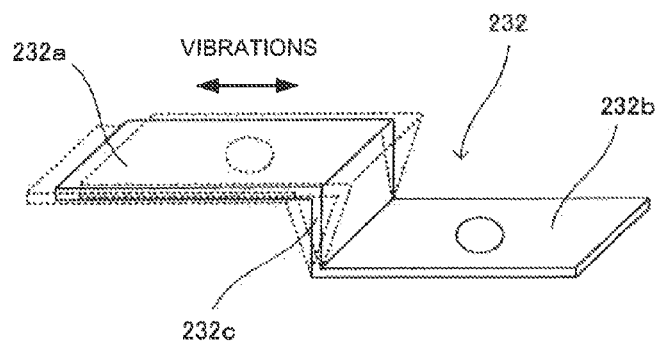
FIG. 6 illustrates the behavior of the connection terminal when horizontal vibrations are applied as an external force.

The effects of the above-described configuration provided for the connection terminal (positive electrode) 132 according to the present embodiment will be described in detail by way of comparative examples. FIG. 4 is a schematic diagram illustrating a force acting on a connection terminal 232 according to comparative example 1. FIG. 5 shows the behavior of the connection terminal 232 when the terminal bolt (positive electrode) 13 receives an external rotational force. FIG. 6 shows the behavior of the connection terminal 232 when the terminal bolt (positive electrode) 13 receives horizontal vibrations.

Figure 7:
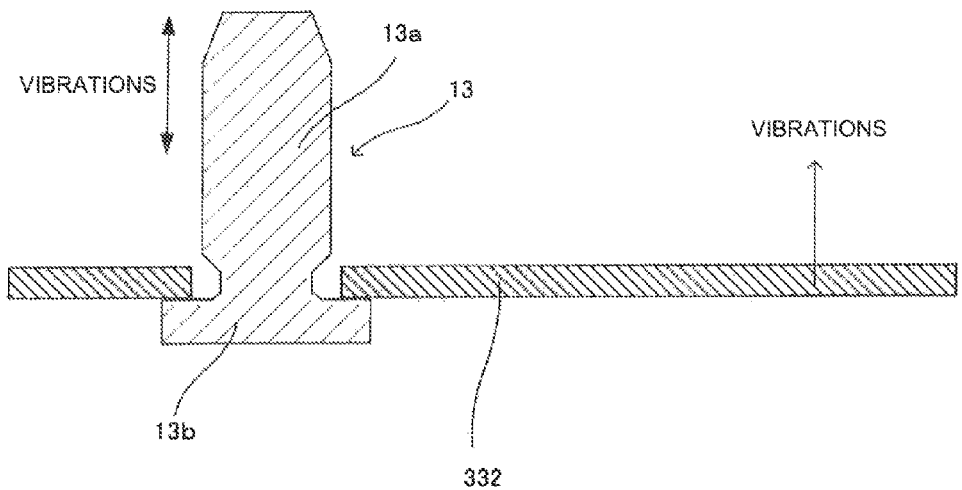
FIG. 7 is a schematic diagram schematically illustrating a force acting on a connection terminal in comparative example 2.
Figure 8:
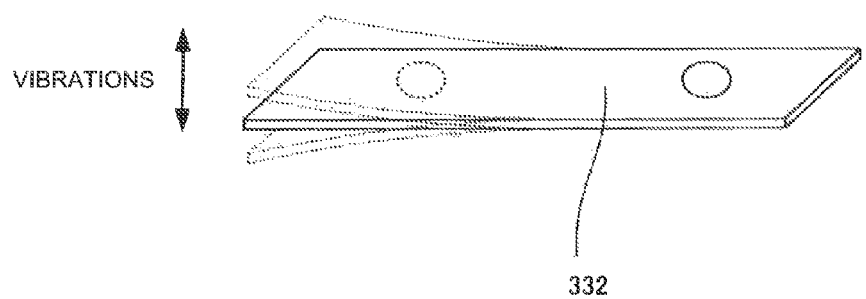
FIG. 8 illustrates the behavior of the connection terminal when vertical vibrations are applied as an external force.

FIG. 7 is a schematic diagram schematically illustrating a force acting on a connection terminal 332 according to comparative example 2. FIG. 8 schematically illustrates the behavior of the connection terminal 332 when the terminal bolt (positive electrode) 13 receives an external axial force. In FIGS. 4 and 7, components other then the connection terminals and terminal bolts (positive electrodes) are omitted. In FIGS. 5, 6, and 8, components other than the connection terminals are omitted.

Referring to FIG. 4, the connection terminal in comparative example 1 is different from the connection terminal (positive electrode) 132 according to the present embodiment in that a terminal-fastening surface 232a and a securing piece 232b are connected through a stepped portion 232c extending vertically and that the terminal-fastening surface 232a and the securing piece 232b do not have regions overlapping each other as viewed in a direction orthogonal to the thickness of the connection terminal 232. The terminal-fastening surface 232a corresponds to the terminal-fastening surface 132a, and the securing piece 232b corresponds to the terminal-securing surface 132b. Referring to FIGS. 4 and 5, in the configuration in comparative example 1, a rotational force acting on the connection terminal 232 when a bus bar is fastened is received by the thin-walled stepped portion 232c. Therefore, the stepped portion 232c may deform, and sufficient fastening torque may not be obtained. Referring to FIGS. 4 and 6, when the terminal bolt (positive electrode) 13 vibrates horizontally after the bus bar is fastened, the terminal-fastening surface 232a and the thin-walled stepped portion 232c may oscillate with the bent portions of the stepped portion 232c serving as origins.

Referring to FIG. 7, the connection terminal in comparative example 2 has a flat shape extending horizontally, and this structure is advantageous for horizontal vibrations. However, since a portion to which the bus bar is fastened and a portion to which the rivet portion is riveted (hereinafter referred to as a rivet-secured portion) are located in the same plane, the force of the terminal bolt (positive electrode) 13 vibrating axially directly acts on the rivet-secured portion, so that the sealing properties of the cell case 10 may be impaired.

However, in the connection terminal (positive electrode) 132 in the present embodiment, the terminal-fastening surface 132a and the terminal-securing surface 132b have regions overlapping each other as viewed in a horizontal direction, so that the problems in comparative example 1 can be solved. More specifically, the rotational force acting on the connection terminal 132 when the bus bar is fastened can be received by the thick-walled portion of the terminal-fastening surface 132a and the thick-walled portion of the terminal-securing surface 132b, so that sufficient fastening torque can be obtained. Therefore, contact resistance becomes small, and the performance of the cell can be improved. In addition, a horizontal cyclic load acting on the connection terminal 132 after the bus bar is fastened can be received by the highly stiff thick-walled portion of the terminal-fastening surface 132a and the highly stiff thick-walled portion of the terminal-securing surface 132b.

In the connection terminal (positive electrode) 132 in the present embodiment, the terminal-fastening surface 132a and the terminal-securing surface 132b are located at different levels, so that the problem in comparative example 2 can be solved.

More specifically, after the cell is mounted on a vehicle, axial vibrations acting on the terminal bolt (positive electrode) 13 can be absorbed by the inclined portion 132c, so that a load applied to a portion at which the rivet portion 131a and the terminal-securing surface 132b are connected can be reduced. Therefore, misalignment between the insulator 133 and the gasket 134 is suppressed, and the reduction in the sealing properties of the cell case 10 can be suppressed.

Referring to FIG. 3, let the difference between the level of the upper surface of the terminal-fastening surface 132a and the level of the upper surface of the terminal-securing surface 132b be A1, and the distance between the rivet portion 131a and the terminal bolt (positive electrode) 13 be A2. Then it is preferable that the following conditional expression (1) hold.

$$A1/A2 \leq 0.5 \tag{1}$$

When A1 and A2 satisfy the above conditional expression (1), the effects of the above embodiment can be improved. The distance A2 means the distance between the center axis of the rivet portion 131a that extends in the vertical direction (the Z-axis direction) and the center axis of the terminal bolt (positive electrode) 13 that extends in the vertical direction (the Z-axis direction).

(Modification 1)

Figure 9:
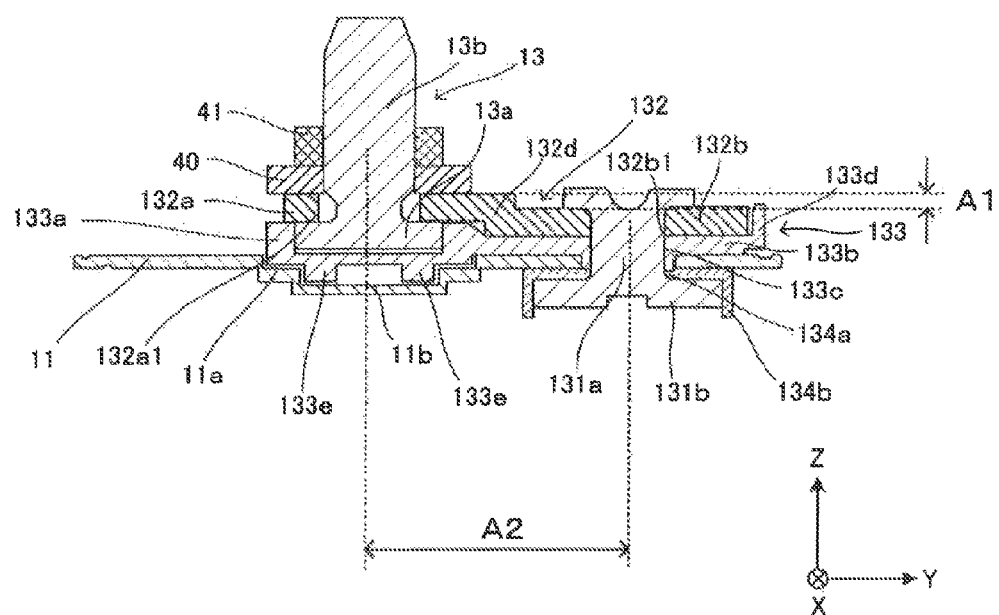
FIG. 9 is a cross-sectional view of a connection structure for the terminal bolt (positive electrode) and the power generation element in modification 1.

In the above embodiment, the terminal-fastening surface 132a and the terminal-securing surface 132b are connected through the inclined portion 132c. However, the present invention is not limited thereto, and a different shape may be used. FIG. 9 is a cross-sectional view illustrating a connection electrode in this modification and corresponds to FIG. 3. Referring to FIG. 9, the above different shape may be a stepped shape in which the terminal-fastening surface 132a and the terminal-securing surface 132b are connected through a vertical portion 132d extending in the vertical direction (Z-axis direction).

(Modification 2)

Figure 10:
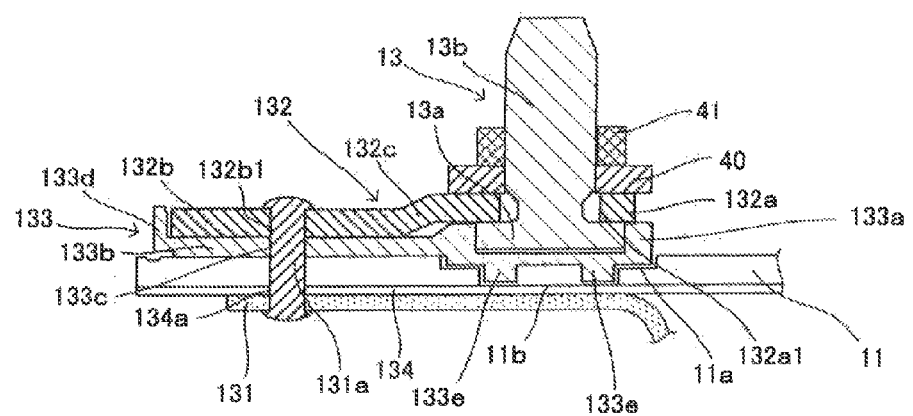
FIG. 10 is a cross-sectional view of a connection structure for the terminal bolt (positive electrode) and the power generation element in modification 2.
Figure 10:
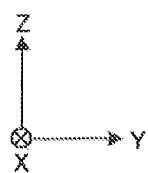

FIG. 10 is a cross-sectional view of a connection structure for the terminal bolt (positive electrode) and the power generation element according to modification 2, and components having the same functions as in the above embodiment are denoted by the same reference numerals. The differences from the above embodiment will be mainly described. Referring to FIG. 10, the terminal bolt (positive electrode) 13 according to modification 2 is disposed at a position spaced further away from the center of the vehicle cell 1 than the rivet portion 131a. The upper end of the rivet portion 131a is swaged on the upper surface of the terminal-securing surface 132b, and the lower end of the rivet portion 131a is swaged on the current collecting terminal (positive electrode) 131. The gasket 134 is interposed between the current collecting terminal (positive electrode) 131 and the lid 11. As described above, the present invention is applicable to the cell having the connection structure for connecting the connection terminal 132 and the power generation element 12 different from that in the above embodiment.

(Modification 3)

In the above embodiment, the vehicle cell 1 has been described. However, the present invention is not limited thereto and may be used for a different application. The different application may be a power tool vibrating during operation. The power tool may be a lawn mower or a chain saw. Specifically, the cell of the present invention can be preferably mounted not only on a vehicle but also on any of various battery-mounted devices, such as a lawn mower or a chain saw, that vibrate during operation.

The invention claimed is:
1. A cell comprising:
a closed-end tubular case for accommodating a power generation element;
a lid for the case;
a terminal electrode disposed outside of the case and used for connection with another cell;
an extraction electrode passing through the lid and used to extract electric power from the power generation element to the outside of the case; and
a stepped connection electrode disposed outside of the case, the stepped connection electrode having a first flat portion to which the terminal electrode is connected and a second flat portion which is located at a level different from a level of the first flat portion and to which the extraction electrode is connected, wherein the first and second flat portions have regions overlapping each other as viewed in a direction orthogonal to a direction of a thickness of the first and second flat portions.

2. The cell according to claim 1, wherein
the extraction electrode includes a rivet portion passing through the lid, and the following conditional expression (1) is satisfied:

$$A1/A2 \leq 0.5 \tag{1}$$

where A1 is a difference between a level of an upper surface of the first flat portion and a level of an upper surface of the second flat portion, and A2 is a distance between the rivet portion and the terminal electrode.

3. The cell according to claim 2, wherein
the extraction electrode further includes a rivet supporting portion located inside the lid to support the rivet portion,
a first gasket is interposed between the second flat portion and the lid,
a second gasket is interposed between the lid and the rivet support portion, and
the rivet portion passes through the second gasket, the lid, the first gasket, and the second flat portion and is swaged on the upper surface of the second flat portion.

4. The cell according to claim 1, wherein
a thread groove is formed on an outer surface of the terminal electrode, and
a bus bar for connecting the cell to another cell is fixed by inserting the terminal electrode therein, and screwing a nut onto the thread groove.

5. An assembled battery formed by connecting a plurality of the cells according to claim 1.

6. The assembled battery according to claim 5, used as a power source for driving a vehicle.

7. The assembled battery according to claim 5, used as a power source for driving a power tool.

8. A battery-mounted device on which the assembled battery according to claim 5 is mounted.

* * * * *